Nov. 28, 1961

H. E. ANDERSON 3,010,404

CHEMICAL FEED PUMP

Filed March 11, 1957

INVENTOR.
Herbert E. Anderson
BY
C. M. McKnight
ATTORNEY

Nov. 28, 1961    H. E. ANDERSON    3,010,404
CHEMICAL FEED PUMP
Filed March 11, 1957    2 Sheets-Sheet 2

INVENTOR.
Herbert E. Anderson
BY
C. M. McKnight
ATTORNEY

United States Patent Office 3,010,404
Patented Nov. 28, 1961

3,010,404
CHEMICAL FEED PUMP
Herbert E. Anderson, P.O. Box 1183, Muskogee, Okla.
Filed Mar. 11, 1957, Ser. No. 645,268
4 Claims. (Cl. 103—152)

This invention relates to improvements in a chemical feed pump, and more particularly, but not by way of limitation, to a feed pump designed and constructed to add chemicals to a flow stream in direct proportion to the flow of the stream regardless of the pressure within the flow line through which the fluid stream is moving.

The present invention contemplates a simple and economical chemical feed pump for adding a chemical solution to a flow line, such as adding chlorine and the like to a water supply system. The novel pump comprises a diaphragm member adapted to alternately flex in opposed directions for pumping the chemical solution through the pump and into the water flow line. The pump is so designed that the pressures acting on both sides of the diaphragm are equalized and are always equal to the pressure within the flow line. Thus, only the relatively small spring pressure of the diaphragm return spring member must be overcome in the operation of the diaphragm for pumping the chemical solution into the flow line. In this manner, the pump functions efficiently at all times, regardless of the pressure present within the flow line. Furthermore, the equalization of the pressures acting on the diaphragm member greatly prolongs the efficient and useful life of the diaphragm.

The diaphragm member is flexed within the pump by means of a reciprocating shaft member. The shaft member is in turn moved in one direction by a cam lever or follower member which is actuated or oscillated by a floating cam member. The cam member is operably connected to a conventional water meter which is usually interposed in the flow line. The meter functions to rotate the cam member directly in proportion to the rate of flow of the water through the meter and flow line. Thus, the diaphragm member is flexed at the required rate of speed for pumping the chemical solution into the water line in direct proportion to the rate of flow of the water moving therethrough.

It is an important object of this invention to provide a novel pump for feeding a chemical solution directly into a flow stream.

It is another object of this invention to provide a novel chemical feed pump particularly designed and constructed for adding a chemical solution to a liquid in a flow line in direct proportion with the rate of flow of the liquid through the flow line.

Another object of this invention is to provide a novel chemical feed pump for efficiently adding a chemical solution to a liquid regardless of the pressure present within the flow line through which the liquid is moving.

And still another object of this invention is to provide a novel diaphragm actuated pump wherein the pressures acting on the opposing faces of the diaphragm are equal at all times, thereby greatly prolonging the useful and efficient life thereof.

It is a further object of this invention to provide a novel chemical feed pump which is simple and efficient in operation and economical and durable in operation.

Other objects and advantages of the invention will be evident from the following detailed description, read in conjunction with the accompanying drawings, which illustrate my invention.

Figure 2:
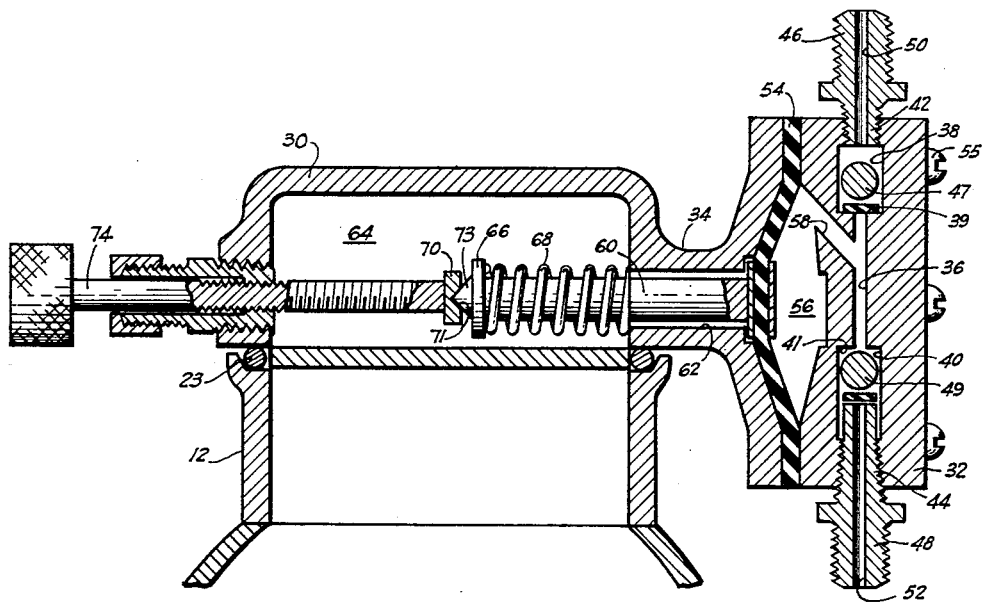
FIGURE 2 is a sectional elevational view of a chemical feed pump embodying the invention, taken on line 2—2 of FIG. 3.
Figure 1:
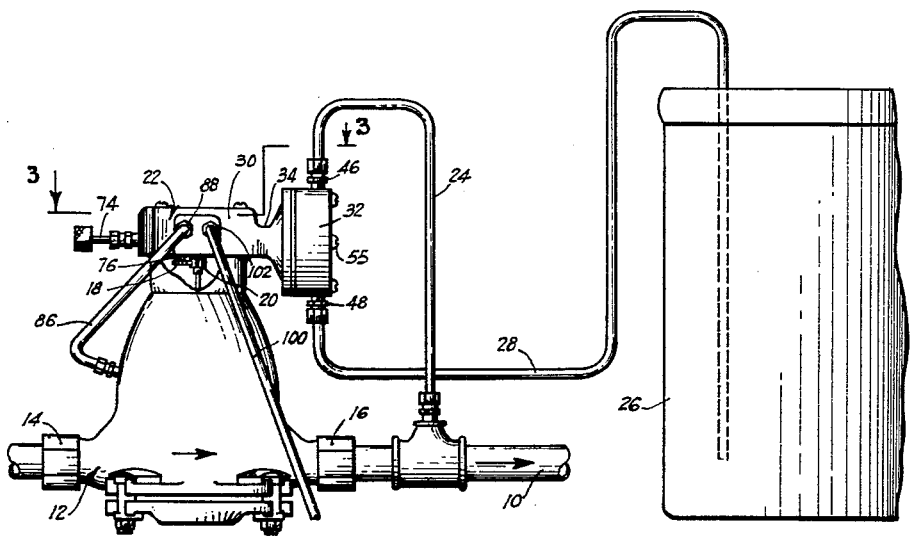
FIGURE 1 is an elevational view of a chemical feed pump embodying the invention, and depicted in connection with a conventional type water meter for adding a chemical solution to a water flow line.

Referring to the drawings in detail, and particularly FIG. 1, reference character 10 indicates a conduit or water line having water or the like (not shown) flowing therethrough. A gear type water meter 12 is interposed in the water line 10 by suitable coupling members 14 and 16 whereby the flow of the water in the conduit 10 is directed through the meter 12. The meter 12 is actuated by the flow stream as is well known. The interior of the water meter 12 is normally filled with water at the same pressure as that of the water flowing through the conduit 10. The water meter 12 is normally provided with a register portion (not shown) which is driven by a pair of mating gear members 18 and 20 in any well known manner for metering the flow of water through the meter. In the persent instance, however, the register portion of the meter is removed from the meter 12 and a feed pump 22 is suitably bolted, or the like (not shown), to the meter in lieu thereof. A suitable annular sealing gasket 23 (FIG. 2) is preferably provided therebetween to preclude leakage of fluid. The pump 22 is driven by the mating gear members 18 and 20, which in turn are actuated in the usual manner by the meter 12. The flow of fluid through the meter 12, as viewed in FIG. 2, is from the left to right, as shown by the arrow.

The pressure side of the pump 22 is in communication with the conduit 10 downstream of the meter 12 by means of a suitable pipe 24, and the suction side of the pump is in communication with a reservoir tank 26 through a pipe member 28, as will be hereinafter set forth in detail. A suitable chemical solution (not shown) is stored in the reservoir 26 and is pumped therefrom by the pump 22 for discharge or injection into the flow line 10 for mixing with the water flowing therethrough.

The pump 22 comprises a substantially cylindrical case or housing portion 30 having a sectional round block member 32 connected therewith by a reduced neck portion 34. A diametrical passageway 36 extends through the block member 32, and is provided with enlarged bore portion 38 at one end thereof to provide an annular shoulder 39. An enlarged bore portion 40 is provided at the opposite end of the bore 36 to provide an annular shoulder 41, as clearly shown in FIG. 2. The bores 38 and 40 are threaded at the outer ends thereof, 42 and 44, respectively, for receiving suitable threaded connection members 46 and 48 therein. The members 46 and 48 are provided with longitudinal bores 50 and 52, respectively, extending into communication with the enlarged bore portions 38 and 40. The connection member 46 functions to connect the conduit 24 with the pressure side of the pump 22, and the connection member 48 similarly connects the conduit 28 with the suction side of the pump. A suitable ball check valve 47, or the like, is provided in the enlarged bore 38, and a similar check valve 49 is provided in the enlarged bore 40 for a purpose as will be hereinafter set forth.

A flexible diaphragm member 54 is suitably secured within the sectional block member 32 in any well known manner, such as the screw members 55. The diaphragm 54 extends across a diaphragm chamber 56 provided within the head member 32. The diaphragm chamber 56 is in communication with the diametrical passageway 36 through a suitable bore or passageway 58. A reciprocable shaft member 60 is suitably secured to the diaphragm 54 for flexing thereof in a manner as will be hereinafter set forth. The shaft 60 extends through a bore 62 provided in the neck portion 34 and into the interior chamber 64 of the housing 30. The bore 62 is of a larger diameter than the diameter of the shaft 60, thereby providing communication between the chamber 62 and the left hand side of the diaphragm 54, as viewed in the drawings.

An outwardly extending circumferential flange 66 is provided on the shaft 60 spaced from the diaphragm member 54. A helical spring member 68 is disposed around the shaft 60 and has one end anchored at the flange 66, and the opposite end anchored at the housing 30 adjacent the bore 62. The spring 68 constantly urges the shaft 60 toward the left, as viewed in the drawings.

A cam follower lever member 70 is suitably pivotally secured within the housing 30 at a point 72 in such a manner that the lever 70 may be oscillated in a manner as will be hereinafter set forth in order to physically contact the shaft 60 for urging the shaft toward a right hand direction against the action of the spring 68. It will be apparent that the cam follower 70 may be provided with a detent 71 in the proximity of the lower end thereof to receive the pointed end portion 73 of the shaft 60, as shown in FIG. 2, in order to facilitate alignment between the shaft and cam follower. Thus, a counter-clockwise rotation of the lever 70 will urge the shaft toward the right. A clockwise rotation of the lever 70 will move the lever 70 in a direction away from the shaft 60 whereby the force of the spring 68 will move the shaft 60 back to the left. In this manner, a reciprocal movement of the shaft 60 is provided for flexing the diaphragm 54 within the diaphragm chamber 56.

A suitable externally threaded shank or bolt member 74 is threadedly inserted through the housing 30 and extends into the chamber 64 for limiting the clockwise rotation of the member 70. The limit of the leftward movement of the lever 70 determines the length of the leftward stroke of the shaft 60. It will be apparent that the bolt 74 may be extended into the chamber 64 at substantially any desired distance for the leftward movement of the shaft 60 and diaphragm 54, thereby determining the amount of chemical solution pumped into the flow line 10, as will be hereinafter set forth in detail.

The power from the meter 12 is directed to the mating gears 18 and 20 in any well known manner (not shown) for rotation of a shaft 76 which is suitably affixed to the gear 18 and extends upwardly therefrom into the chamber 64. A hub member 78 is keyed or suitably rigidly secured to the shaft 76 for simultaneous rotation therewith. A lower cam member 80 and an upper cam member 82 are rigidly secured on the hub member 78 for simultaneous rotation therewith. The cam member 80 is positioned within the chamber 64 in such a manner that the cam follower member 70 continuously rides along the outer periphery thereof. The outer periphery of the cam member 80 increases radially around the circumference of the cam, and the enlarged circumference is connected to the smaller circumference by means of a substantially straight shoulder portion 84. Thus, upon rotation of the cam 80, the follower member 70 rides adjacent the progressively increasing periphery of the cam whereby the follower is moved or pivoted about the pin 72 in a counter-clockwise direction. When the cam 80 has rotated sufficiently for the shoulder 84 to come into contact with the follower 70, the follower moves therealong until it contacts the smaller portion of the periphery, thereby providing for a clockwise rotation of the follower 70 about the pin 72. It will be apparent that the force of the spring 68 urging the shaft 60 toward the left will facilitate the movement of the follower 70 along the shoulder 84. Thus, the follower 70 oscillates about the pin 72 in a manner similar to a pendulum as the cam member 80 is continuously rotated by the gear member 18. Thus, the shaft member 60 is continuously reciprocated, as hereinbefore set forth, by the combined actions of the follower 70 and the return spring 68, for a continual reciprocal flexing of the diaphragm 54.

The reciprocal flexing of the diaphragm 54 creates alternate conditions of vacuum and pressure within the bore 36. For example, a left hand flexing of the diaphragm 54 creates a suction or slight vacuum in the chamber 56, and the vacuum or lowered pressure is communicated to the bore 36 through the passageway 58. The slight vacuum thus provided in the bore 36 functions to move the check valve 47 in a direction away from the fitting member 46 and into a seating position on the annular shoulder 39, thereby closing the bore 36 and precluding the flow of fluid therethrough. Simultaneously, the suction within the bore 36 moves the check valve 49 in a direction away from the fitting member 48 whereby the bore 52 is opened to permit the flow of fluid therethrough and into the bore 36. The chemical solution from the reservoir 26 will thus fill the bore 36 and the passageway 58 and the chamber 56 during the left hand flexing of the diaphragm 54.

A right hand flexing of the diaphragm 54 against the liquid within the chamber 56 increases the pressure acting on the liquid. Since liquid is non-compressible, the increased force moves out of the chamber 56 and into the passageway 36. The increase in pressure within the bore 36 acts on the check valve 47 to urge the valve toward an open position whereby the chemical solution may flow out of the bore 36 and through the bore 50 of the connection member 46. Simultaneously, the increased fluid pressure acts on the check valve 40 to urge the valve toward a closed position adjacent the member 48, thereby precluding the flow of fluid therethrough and into the bore 36. It will be apparent that a continuous reciprocation of the shaft 60 will continually flex the diaphragm 54 in order to move the chemical solution through the head member 32. The fluid flow will be directed from the reservoir tank 26 through the conduit 28 and through the bore 52 of the connecting member 48 for injection into the bore 36, whereupon the chemical solution is discharged from the head 32 through the bore 50 of the fitting member 46 and through the conduit 24 for injection into the flow line 10 for mixing with the water therein.

Figures 3, 4:
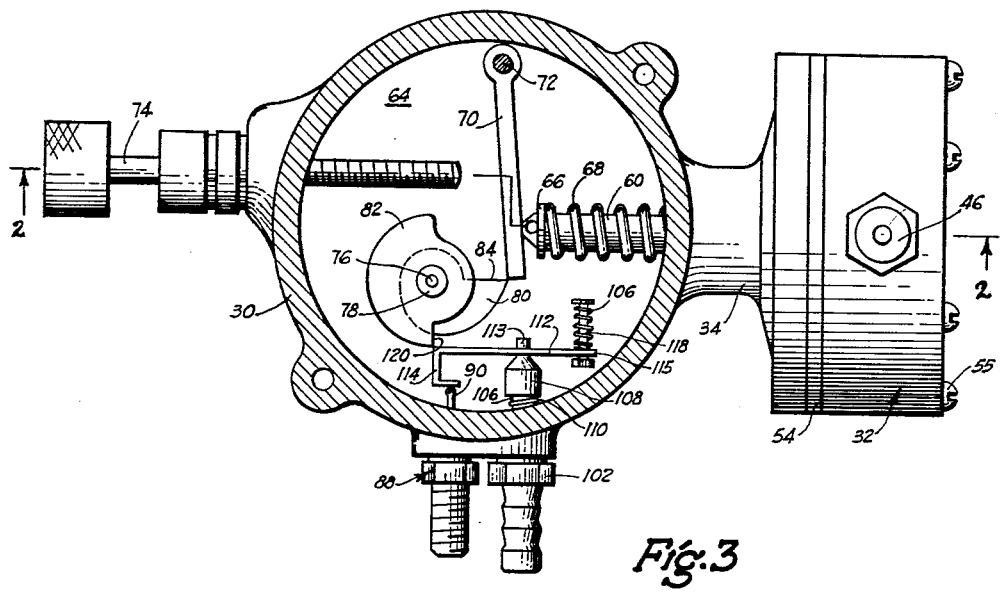
FIGURE 3 is a sectional view of the novel pump taken on line 3—3 of FIG. 1, with portions shown in elevation.
FIGURE 4 is an enlarged sectional view of the lower portion of the depiction shown in FIG. 3.

The chamber 64 of the housing 30 is in communication with the interior of the water meter 12 through a suitable conduit member 86 (FIG. 1) and through a valve 88 provided in the housing 30. The valve 88 is preferably a slide valve, but not limited thereto, having a tubular valve insert member 89 threadedly disposed therein (FIG. 4). A valve stem 90 is reciprocally disposed in the valve insert 89 and extends longitudinally therethrough. An inwardly directed shoulder 92 is provided on the lower end of the valve insert 89 to provide a valve seat for an enlarged head portion 94 provided on the lower end of the stem member 90. A helical spring member 96 is disposed around the valve stem 90 between the shoulder 92 and an upper circumferential shoulder 98 provided on the valve stem 90. The spring cooperates with the upper circumferential shoulder 98 for constantly urging the stem 90 in an upward direction, as viewed in the drawings, whereby the head member 94 will be seated on the valve seat 92 for maintaining the valve 88 in a normally closed position.

The chamber 64 is in communication with the atmosphere or a suitable drain receptacle (not shown) through a suitable conduit 100 and a suitable drain valve 102. The valve 102 is threadedly inserted through the housing 30 and is provided with a longitudinal bore 104 extending therethrough. A reduced neck portion 106 is provided on the upper end of the valve 102, as viewed in FIG. 4, and extends into the chamber 64 to provide a valve seat for a reciprocal valve cap or head member 108. A helical spring member 110 is disposed around the neck portion 106 for constantly urging the valve cap member 108 upwardly toward a normally open position for the valve 102.

A cam follower lever arm member 112 is loosely disposed on a projection member 113 which extends axially from the valve cap member 108. The projection member 113 functions to assist in supporting the lever arm 112 within the chamber 64. One end 114 of the lever 112 is suitably bent or formed in order to contact the uppermost end of the valve stem 90. The opposite end 115 of the lever arm 112 is slidably disposed on a suitable rod member 116 provided in the housing 30. A helical spring member 118 is disposed around the rod member 116 for constantly urging the end 115 of the lever arm downwardly, as viewed in FIG. 4. The lever arm 112 is disposed within the chamber 64 in such a manner that the periphery of the cam member 82 bears constantly against the lever 112.

The periphery of the cam 82 increases progressively radially outward in such a manner that a clockwise rotation of the cam as viewed in the drawings urges the bent end portion 114 of the lever 112 progressively downwardly against the valve stem 90. A continued downward movement of the end 114 moves the valve stem 90 downwardly within the insert 89 to unseat the head member 94 and open the valve 88, thereby permitting the water within the meter 12 to flow into the chamber 64 for filling thereof. Thus, the fluid pressure within the chamber 64 becomes equal to the fluid pressure within the meter 12, which in turn is equal to the fluid pressure within the flow line 10. The fluid pressure within the chamber 64 is communicated to the rear or left hand side of the diaphragm 54 through the bore 62. The pressure in the diaphragm member 56 is maintained equal to the pressure within the flow line 10 through the conduit 24 and valve 47. Thus, the pressures are equalized on both sides of the diaphragm 54, thereby facilitating the ease of flexing thereof by the oscillatory movement of the lever arm 70, as hereinbefore set forth.

The cam member 82 is provided with a radial shoulder portion 120, as clearly shown in FIG. 4, in order that a continued clockwise rotation of the cam 82 will move the shoulder 120 adjacent the lever arm 112. In this position, the lever arm 112 will move along the shoulder 120 to a position adjacent the smallest radial dimension of the periphery of the cam 82. It will be apparent that the action of the spring 118 urging the end 115 of the lever arm 112 in a downwardly direction will facilitate the movement of the end 114 in a path following the periphery of the cam 82. The movement of the lever arm 112 into a position adjacent the smallest radial portion of the cam 82 will release the downward pressure thereof on the valve stem 90 whereby the valve spring 98 will urge the valve stem 90 upwardly to close the valve 88. Thus, the valve 88 will be alternately opened and closed by the end portion 114 of the lever 112 during the continuous clockwise rotation of the cam member 82.

The downward movement of the end 114 of the lever arm 112, as hereinbefore set forth, causes the arm 112 to bear downwardly on the valve cap member 108, as clearly shown in FIG. 4. The cap 108 is therefore, moved downwardly against the action of the spring 110 and seats on the reduced sleeve portion 106 to close the valve 102. Thus, when the valve 88 is open to permit water to flow from the meter 12 into the chamber 64, the valve 102 is simultaneously closed to preclude any discharge of the fluid from the chamber.

The upward movement of the end 114 of the lever 112, as hereinbefore set forth, causes the arm 112 to release the downward pressure on the valve cap 108 whereby the spring 110 will urge the valve cap 108 upwardly to open the valve 102 for discharging fluid from the chamber 64. Thus, when the valve 88 is in a closed position to preclude the flow of water from the meter 12 to the chamber 64, the valve 102 will be in an open position to permit a discharge of the fluid therefrom. It will be apparent that the end 115 of the arm 112 will move or slide reciprocally along the rod member 116 to facilitate the pivotal action of the lever arm.

As hereinbefore set forth, the cam members 82 and 80 are rigidly keyed or secured to a common hub 78 for a simultaneous rotation. The shoulder 84 of the cam 80 is positioned with respect to the shoulder 120 of the cam 82 in order that respective shoulder portions are simultaneously moved into contact with the lever arms 70 and 112. Thus, a left hand movement of the lever 70, will coincide with the upward movement of the end 114 of the arm 112. The periphery of the cams 80 and 82 are also designed in such a manner that the end 114 of the arm 112 is moved downwardly simultaneously with a right hand movement for the arm 70. In this manner, water is admitted to the chamber 64 through the open valve 88 during a right hand flexing of the diaphragm 54, and the water is drained therefrom through the open valve 102 during a left hand flexing of the diaphragm 54.

*Operation*

When it is desired to add a chemical solution, such as a chlorine solution or the like, to a flow stream, such as a city water supply system, the novel pump 22 is preferably secured to a water meter 12 in lieu of the register portion (not shown) normally provided thereon. The water meter 12 is interposed in the flow line 10 and is actuated in any well known manner by the flow stream moving therethrough. The gears 18 and 20 of the meter 12 are utilized for operation of the pump 22 in such a manner that the quantity of chemical solution added to the flow line 10 is proportionate to the volume or pressure of the water moving through the line. The diaphragm member 54 of the pump 22 is reciprocally flexed at a rate of speed as determined by the rotation of the gears 18 and 20, thereby moving the chemical solution through the pump 22 in a direct ratio with respect to the flow of water through the meter 12.

The quantity or volume of chemical solution moved through the pump 22 with each stroke of the shaft 60 may be predetermined by regulating the length of the stroke. The threaded shank member 74 may be positioned at substantially any desired position in order to limit the left hand movement of the pivotal lever 70, thereby limiting the leftward movement of the shaft 60. In this manner, the stroke of the shaft may be predetermined in accordance with the quantity of chemical solution desired for mixing with the water in the flow line. Furthermore, the cam members 80 and 82 rotate simultaneously and are so timed or positioned with respect to each other that the valve 88 is open during the right hand flexing of the diaphragm, thereby admitting water from the meter 12 to the chamber 64. In this manner, the fluid pressure on the left hand side of the diaphragm is maintained equal to the fluid pressure on the right hand side thereof to facilitate the flexing thereof. Similarly, the drain valve 102 is open during a left hand flexing of the diaphragm 54 in order to discharge fluid from the chamber 64 in order to permit the return spring 68 to move the shaft 60 in a left hand direction and complete the stroke thereof.

A continuous operation of the pump 22 in accordance with the rate of the flow stream is assured at all times since the pump is powered by the meter 12. Thus, the chemical solution is continually pumped from the reservoir 26 into the flow line 10 in direct proportion to the rate of flow of the liquid within the line, and in a quantity or volume as determined by the positioning of the member 74. The pump 22 will efficiently add the chemical solution to the flow line regardless of the fluid pressure within the line, and in a direct proportion to the rate of flow therethrough.

From the foregoing, it will be apparent that the present invention provides a novel feed pump for injection of a chemical solution into a flow stream for mixing therewith. The novel pump efficiently adds the chemical solution to the fluid stream in direct proportion to the rate of flow of the stream regardless of the pressure present within the flow line. The feed pump of the invention is simple and efficient in operation and durable and economical in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In an apparatus of a character described, in combination, a pump comprising a housing, a pump head member secured to the housing, inlet and outlet passageways containing valve means to prevent reverse flow provided in the head member for direction of fluid therethrough, a flexible diaphragm member disposed within the pump head member for moving fluid through the head member, a reciprocal shaft member secured to the diaphragm for flexing thereof, said shaft member extending into the interior of the housing, a pivotal lever arm member disposed within the housing for moving the shaft in one directcion, a return spring member disposed around the shaft for biasing the shaft against the lever member and moving the shaft in an opposite direction, means for contacting the lever arm and limiting the movement of the shaft in the opposite direction thereby limiting the flexing of the diaphragm in order to regulate the volume of fluid moving through the head member, cam means rotatably disposed within the housing for actuating the pivotal lever arm, means for equalizing the pressure acting on the diaphragm member, said last named means comprising a second pivotal lever yieldingly contacting the cam means, the second lever movable to a position whereby an inlet valve is opened to allow fluid to flow into the housing during flexing of the diaphragm in one direction, and the second lever movable to a second position whereby an outlet valve in the housing is opened to allow fluid within the housing to be exhausted during flexing of the diaphragm in an opposite direction.

2. In an apparatus of the character described, in combination, a pump comprising a housing, a block member secured hereto, inlet and outlet passageways containing valve means to prevent reverse flow provided in the block member for direction of fluid therethrough, a flexible diaphragm member disposed within the block member for moving the fluid through the block member, a reciprocal shaft member secured to the diaphragm for flexing thereof, said shaft member extending into the interior of the housing, a pivotal lever arm disposed within the housing for moving the shaft in one direction, a return spring member disposed around the shaft and biasing the shaft against the lever arm for moving the shaft in an opposite direction, means positioned in the path of movement of the lever arm for limiting the movement of the shaft in the opposite direction, the limiting action also limiting the flexing of the diaphragm thereby regulating the volume of fluid moved through the block member, a pair of cam members rotatably disposed within the housing, one of the cam members contacting the pivotal arm for a flexing of the diaphragm in one direction and movement of fluid through the block member, an inlet valve disposed in the housing for permitting entry of fluid into the housing, an outlet valve disposed in the housing for permitting the exhausting of fluid from the housing, a second pivotal arm for control of the inlet and outlet valves disposed within the housing, the second pivotal arm yieldingly contacting the second cam member and movable into a first position for permitting entry of fluid into the housing during the flexing of the diaphragm in one direction, and the second pivotal arm movable into a second position for permitting exhaustion of the fluid from the housing during flexing of the diaphragm in the opposite direction.

3. In an apparatus of the character described, in combination, a pump comprising a housing adapted to be positioned on the upper portion of a water meter, an auxiliary housing member connected to the housing, inlet and outlet passageways containing valve means to prevent reverse flow provided in the auxiliary member for directing fluid therethrough, a flexible diaphragm member disposed within the auxiliary member for moving fluid through the auxiliary member, a reciprocal shaft member secured to the diaphragm for flexing thereof, said shaft member extending into the interior of the housing, a pivotal lever arm disposed within the housing for moving the shaft in one direction, a return spring member disposed around the shaft and biasing the shaft against the lever arm for moving the shaft in an opposite direction, a stop member projecting into the interior of the housing for contacting the lever arm and limiting the movement of the shaft and the connected diaphragm member in the opposite direction thereby regulating the volume of fluid moving through the auxiliary member, first and second cam members rotatably disposed within the housing, the first cam member contacting the pivotal lever arm for flexing the diaphragm in a direction for moving fluid through hte auxiliary member, valve means disposed in the housing for permitting fluid to enter the housing and to be exhausted therefrom, and a biased lever arm contacting the second cam member and controlling the said valve means in order to allow entry of fluid into the housing during movement of the diaphragm in a pressure stroke and exhaustion of the fluid from the housing during movement of the diaphragm in an intake stroke thereby equalizing the pressure acting on the diaphragm member.

4. In an apparatus of the character described, in combination, a pump comprising a housing adapted to be secured to a water meter, a pump head member connected to the housing, inlet and outlet passageways containing valve means to prevent reverse flow provided in the pump head member for directing fluid therethrough, a flexible diaphragm member disposed within the pump head member for moving fluid therethrough, a reciprocal shaft member secured to the diaphragm for flexing thereof, said shaft member extending into the interior of the housing, a pivotal lever arm disposed within the housing for moving the shaft in one direction, a return spring member disposed around the shaft and biasing the shaft against the lever arm for moving the shaft in an opposite direction, a stop member projecting into the interior of the housing for contacting the lever arm and limiting the movement of the shaft and the connected diaphragm member in the opposite direction thereby regulating the volume of fluid moving through the pump head member, first and second cam members journalled within the housing, the first cam member contacting the pivotal lever arm for flexing the diaphragm in a direction for moving the fluid through the pump head member, inlet and outlet valve means disposed in the housing for permitting entry of fluid into the housing and the exhaust therefrom, a second lever arm biased into contact with the second cam member and controlling the opening and closing of the inlet and outlet valves, and the second lever arm controlling the valves in a manner to allow entry of fluid into the housing during movement of the diaphragm in a pressure stroke and to allow exhaustion of the fluid from the housing during movement of the diaphragm in an intake stroke.

(References on following page)

References Cited in the file of this patent

UNITED STATES PATENTS

| | | |
|---|---|---|
| 862,867 | Eggleston | Aug. 6, 1907 |
| 1,720,326 | Halstead et al. | July 9, 1929 |
| 2,242,582 | Jencick | May 20, 1941 |
| 2,289,332 | Booth | July 14, 1942 |
| 2,554,772 | Bereman | May 29, 1951 |
| 2,576,747 | Bryant | Nov. 27, 1951 |
| 2,768,638 | Henke | Oct. 30, 1956 |
| 2,803,195 | Lock | Aug. 20, 1957 |
| 2,837,105 | Henke | June 3, 1958 |
| 2,903,008 | Abbadessa | Sept. 8, 1959 |
| 2,904,876 | Edelen | Sept. 22, 1959 |

FOREIGN PATENTS

| | | |
|---|---|---|
| 370,842 | Great Britain | Apr. 14, 1932 |